(12) United States Patent
Chang et al.

(10) Patent No.: US 10,649,276 B2
(45) Date of Patent: May 12, 2020

(54) BACKLIGHT MODULE AND DISPLAY DEVICE

(71) Applicant: InnoLux Corporation, Jhu-Nan (TW)

(72) Inventors: Chia-Chun Chang, Jhu-Nan (TW); Jen-Hsiang Yen, Jhu-Nan (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 16/161,805

(22) Filed: Oct. 16, 2018

(65) Prior Publication Data

US 2019/0155102 A1 May 23, 2019

(30) Foreign Application Priority Data

Nov. 20, 2017 (CN) .......................... 2017 1 1160169

(51) Int. Cl.
| | | |
|---|---|---|
| *G02F 1/1335* | (2006.01) | |
| *G02F 1/1333* | (2006.01) | |
| *G02F 1/1339* | (2006.01) | |
| *G02F 1/13357* | (2006.01) | |

(52) U.S. Cl.
CPC ...... *G02F 1/133608* (2013.01); *G02F 1/1339* (2013.01); *G02F 1/133308* (2013.01); *G02F 1/133605* (2013.01); *G02F 2001/133314* (2013.01); *G02F 2001/133322* (2013.01)

(58) Field of Classification Search
CPC ......... G02F 1/133608; G02F 1/133308; G02F 1/133605; G02F 1/1339; G02F 2001/133314; G02F 2001/133322
See application file for complete search history.

(56) References Cited

U.S. PATENT DOCUMENTS

| | | | | |
|---|---|---|---|---|
| 8,648,979 B2* | 2/2014 | Kuromizu | ......... | G02F 1/133608 349/58 |
| 8,827,482 B2* | 9/2014 | Yoshikawa | ....... | G02F 1/133603 362/249.01 |
| 2013/0201663 A1* | 8/2013 | Cho | .................. | G02F 1/133608 362/97.2 |
| 2014/0211123 A1* | 7/2014 | Lee | .................. | G02F 1/133606 349/64 |
| 2019/0137827 A1* | 5/2019 | Kugimaru | ......... | G02F 1/133603 |

FOREIGN PATENT DOCUMENTS

| | | | |
|---|---|---|---|
| CN | 102434827 A | | 5/2012 |
| CN | 204477816 U | * | 7/2015 |

* cited by examiner

*Primary Examiner* — Mariceli Santiago
(74) *Attorney, Agent, or Firm* — Muncy, Geissler, Olds & Lowe, P.C.

(57) ABSTRACT

A backlight module and a display device are provided. The display device includes a display panel and a backlight module. The backlight module includes a back plate, a spacer element, and an optical element. The spacer element passes through the back plate and includes a base portion, a supporting portion, a positioning portion and a first protruding portion. The base portion has a first surface and a second surface. The supporting portion is disposed on the first surface. The positioning portion is disposed on the second surface. The first protruding portion is disposed on the second surface and is located around the positioning portion. The first protruding portion has a third surface away from and parallel to the second surface. The optical element is disposed on the spacer element. A part of the back plate is located between the base portion and a part of the positioning portion.

15 Claims, 16 Drawing Sheets

BACKLIGHT MODULE AND DISPLAY DEVICE

CROSS REFERENCE TO RELATED APPLICATIONS

This Non-provisional application claims priority under 35 U.S.C. § 119(a) on Patent Application No(s). 201711160169.3 filed in People's Republic of China on Nov. 20, 2017, the entire contents of which are hereby incorporated by reference.

BACKGROUND

Technical Field

The present disclosure relates to a backlight module and a display device, and in particular, to a direct-type backlight module and a display device having the direct-type backlight module.

Related Art

With the development of technologies, display devices, such as the liquid crystal display devices, have been widely applied to various fields. Due to the advantages such as low power consumption, less weight, compact size and less radiation, the liquid crystal display (LCD) devices have gradually replaced the traditional cathode ray tube (CRT) display devices and been applied to various electronic products, such as mobile phones, portable multimedia devices, notebook computers, liquid crystal TVs and liquid crystal screens.

The LCD device mainly comprises a display panel and a backlight module. The backlight module outputs light, and the light passes through the display panel for displaying images. In the direct-type backlight module, the optical films are disposed above the back plate, and the light source is disposed between the back plate and the optical films. The light emitted from the light source can be evenly diffused in the optical films and then outputted toward the display panel. In addition, a plurality of supporting elements are provided on the back plate for supporting the optical films, so that a distance can be provided between the optical films and the back plate.

In the conventional structure, the supporting element is designed according to the thickness of the back plate. Thus, the back plates with different thicknesses will be provided with supporting elements of different sizes. That is, a specific supporting element should be used for the corresponding back plate with a specific thickness and cannot be applied to other back plates. For example, the common back plates have the thicknesses of 0.6 mm, 0.8 mm and 1.0 mm, so that three different sized supporting elements must be prepared for these back plates with different thicknesses. However, this feature will increase the cost of preparing molds. Besides, the cost for managing and storing the raw materials of these different supporting elements will be increased.

SUMMARY

This disclosure provides a display device, which comprises a display panel and a backlight module. The backlight module is disposed corresponding to the display panel and comprises a back plate, a spacer element and an optical element. The spacer element passes through the back plate and comprises a base portion, a supporting portion, a positioning portion and a first protruding portion. The base portion has a first surface and a second surface disposed opposite to the first surface. The supporting portion is disposed on the first surface, and the positioning portion is disposed on the second surface. The first protruding portion is disposed on the second surface and located around the positioning portion. The first protruding portion has a third surface away from the second surface, and the third surface is parallel to the second surface. The optical element is disposed on the spacer element. A part of the back plate is located between the base portion and a part of the positioning portion.

This disclosure also provides a display device, which comprises a display panel and a backlight module. The backlight module is disposed corresponding to the display panel and comprises a back plate, a spacer element and an optical element. The spacer element passes through the back plate and comprises a base portion, a supporting portion, a positioning portion, a first protruding portion, and a second protruding portion. The base portion has a first surface and a second surface disposed opposite to the first surface. The supporting portion is disposed on the first surface, and the positioning portion is disposed on the second surface. The first protruding portion is disposed on the second surface and has a third surface away from the second surface. A first distance is defined between the third surface and the second surface. The second protruding portion is disposed on the second surface. The first protruding portion is located between the positioning portion and the second protruding portion. The second protruding portion has a fourth surface away from the second surface, and a second distance is defined between the fourth surface and the second surface. The second distance is less than the first distance. The optical element is disposed on the spacer element. A part of the back plate is located between the base portion and a part of the positioning portion.

This disclosure further provides a backlight module, which comprises a back plate, a spacer element and an optical element. The spacer element passes through the back plate and comprises a base portion, a supporting portion, a positioning portion and a first protruding portion. The base portion has a first surface and a second surface disposed opposite to the first surface. The supporting portion is disposed on the first surface, and the positioning portion is disposed on the second surface. The first protruding portion is disposed on the second surface and located around the positioning portion. The first protruding portion has a third surface away from the second surface, and the third surface is parallel to the second surface. The optical element is disposed on the spacer element. A part of the back plate is located between the base portion and a part of the positioning portion.

As mentioned above, in the backlight module and display device of this disclosure, the spacer element comprises a supporting portion disposed on the first surface of the base portion, a positioning portion disposed on the second surface of the base portion, and a first protruding portion disposed on the second surface of the base portion and located around the positioning portion. The first protruding portion has a third surface away from the second surface, and the third surface is parallel to the second surface. The optical element is disposed on the spacer element, and a part of the back plate is located between the base portion and a part of the positioning portion. According to the structural design of this disclosure, the spacer element can cooperate with the back plates with different thicknesses, thereby achieving the functions of assembling alignment and supporting, reducing the cost for developing the molds of the spacer elements, or decreasing the cost for managing and storing the raw materials.

BRIEF DESCRIPTION OF THE DRAWINGS

The embodiments will become more fully understood from the detailed description and accompanying drawings, which are given for illustration only, and thus are not limitative of the present disclosure, and wherein.

DETAILED DESCRIPTION OF THE DISCLOSURE

The embodiments of the disclosure will be apparent from the following detailed description, which proceeds with reference to the accompanying drawings, wherein the same references relate to the same elements.

Figure 1:
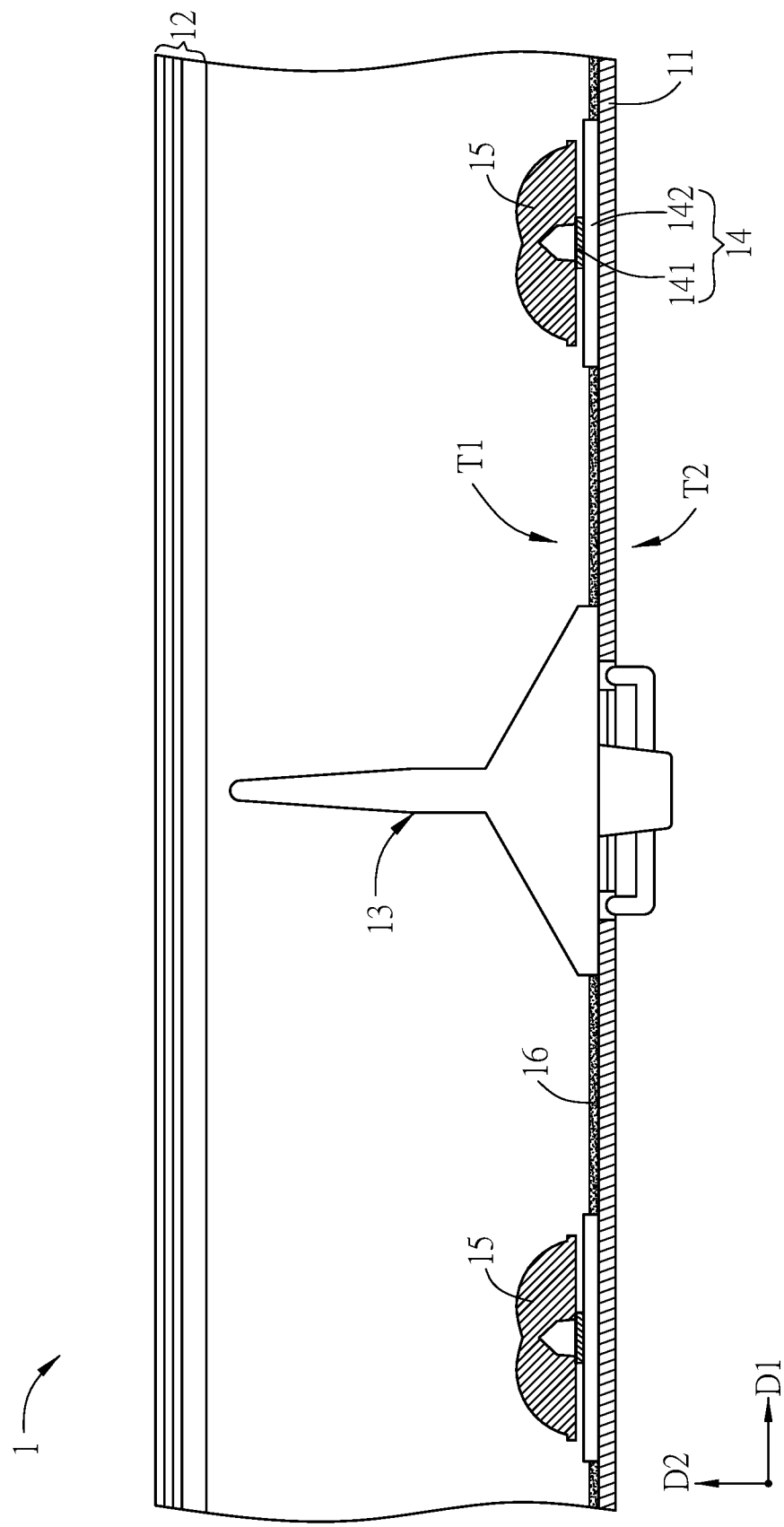
FIG. 1 is a cross-sectional view of a backlight module according to an embodiment of this disclosure.

FIG. 1 is a cross-sectional view of a backlight module 1 according to an embodiment of this disclosure. As shown in FIG. 1, the backlight module 1 of this embodiment is a direct-type backlight module and comprises a back plate 11, at least a spacer element 13 and an optical element 12. In addition, the backlight module 1 of this embodiment further comprises at least a light source 14, at least a light permeable element 15 and a reflective element 16.

The back plate 11 has a first side T1 and a second side T2. The first side T1 and the second side T2 are the opposite sides of the back plate 11. In this embodiment, the first side T1 is defined as the inner side of the back plate 11, and the second side T2 is defined as the outer side of the back plate 11. The back plate 11 is configured to accommodate the components of the backlight module 1 and to provide the protection against collisions, electromagnetic waves, electric shock, moisture, or the likes. The material of the back plate 11 can be selected from plastics, metals, alloys, polyesters, carbon fibers, or any combination thereof, and this disclosure is not limited thereto.

The optical element 12 is disposed on the back plate 11. The backlight module 1 may comprises a plurality of optical elements 12 (e.g. 3 or 4 optical elements 12) such as, for example but not limited to, diffusers, light collection sheets, brightness enhancement films, or optical films with other functions. In practice, the optical element 12 disposed closest to the spacer element 13 can be a diffuser for example. The light source 14 is disposed on the back plate 11 for emitting light toward the optical elements 12. In some embodiments, the light source 14 comprises a plurality of light-emitting elements 141, which are disposed on a substrate 142 in a 2D array arrangement. The light permeable element 15 can be a lens disposed corresponding to the light-emitting elements 141. In practice, the light permeable element 15 can be disposed on the light-emitting element 141. The light-emitting element 141 can be a light-emitting diode (LED). The light emitted from the light source 14 can pass through the light permeable element 15 and the optical element 12 in order. The reflective element 16 is disposed on the back plate 11 for reflecting the light emitted toward the back plate 11 to the optical element 12, thereby increasing the utilization rate of light. The reflective element 16 can be a reflective layer (e.g. a metal coating layer) or a reflective sheet. In this embodiment, the reflective element 16 is a reflective sheet. The reflective element 16 comprises a reflective material such as metal, metal oxide, high reflective paint (white paint), or the combination thereof, and this disclosure is not limited thereto.

The spacer element 13 passes through the back plate 11 and is partially disposed between the back plate 11 and the optical element 12. In some embodiments, the backlight module 1 may comprises a plurality of spacer elements 13, which are disposed on the back plate 11 individually for supporting the optical element 12. Herein, "the optical element 12 is disposed on the spacer element 13" means that the optical element 12 is disposed above or over the spacer element 13, and the spacer element 13 can directly contact the optical element 12 or indirectly contact the optical element 12, or does not contact the optical element 12.

Figure 2A:
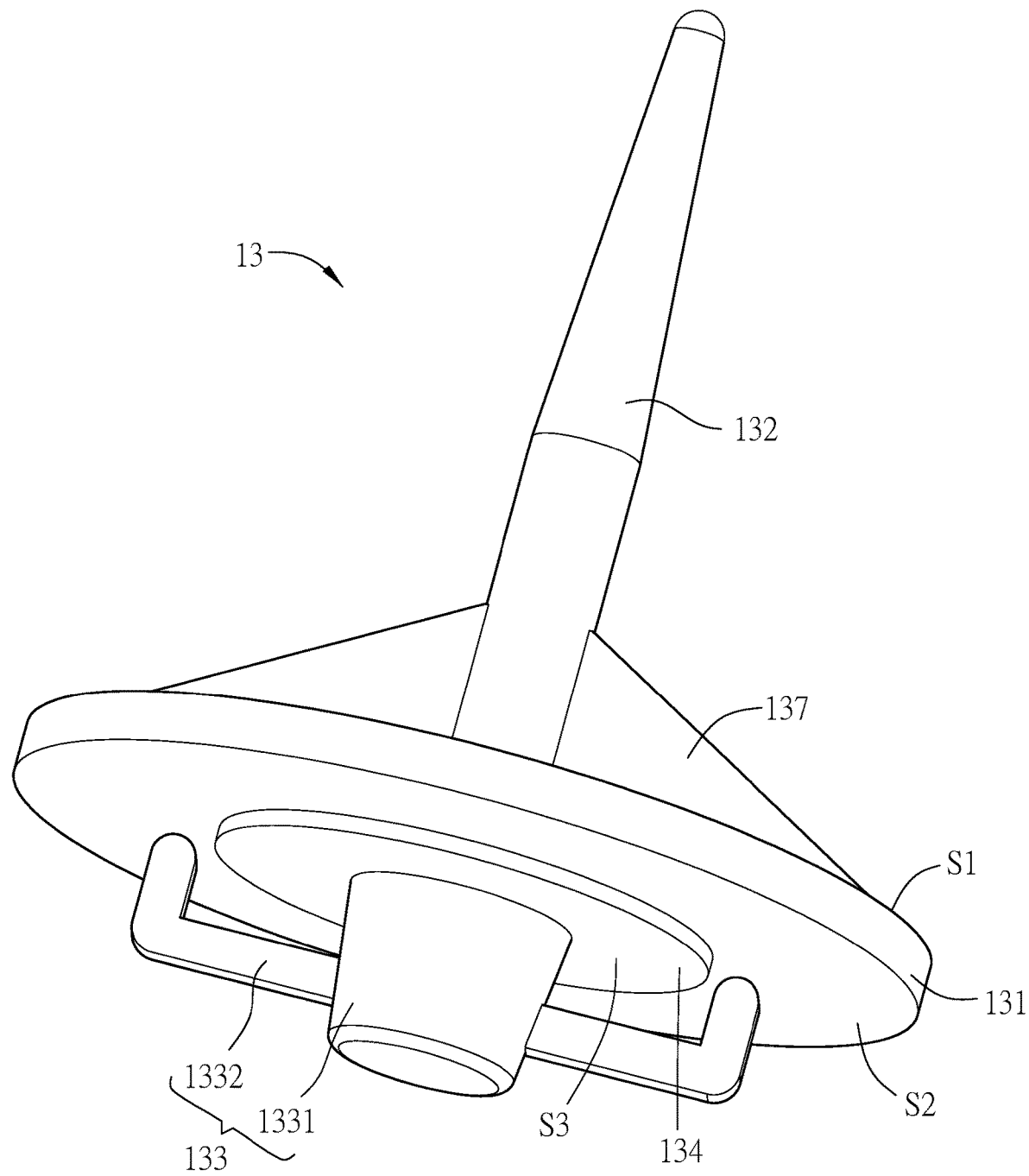
FIG. 2A is a schematic perspective diagram of the spacer element according to an embodiment of this disclosure.
Figure 2B:
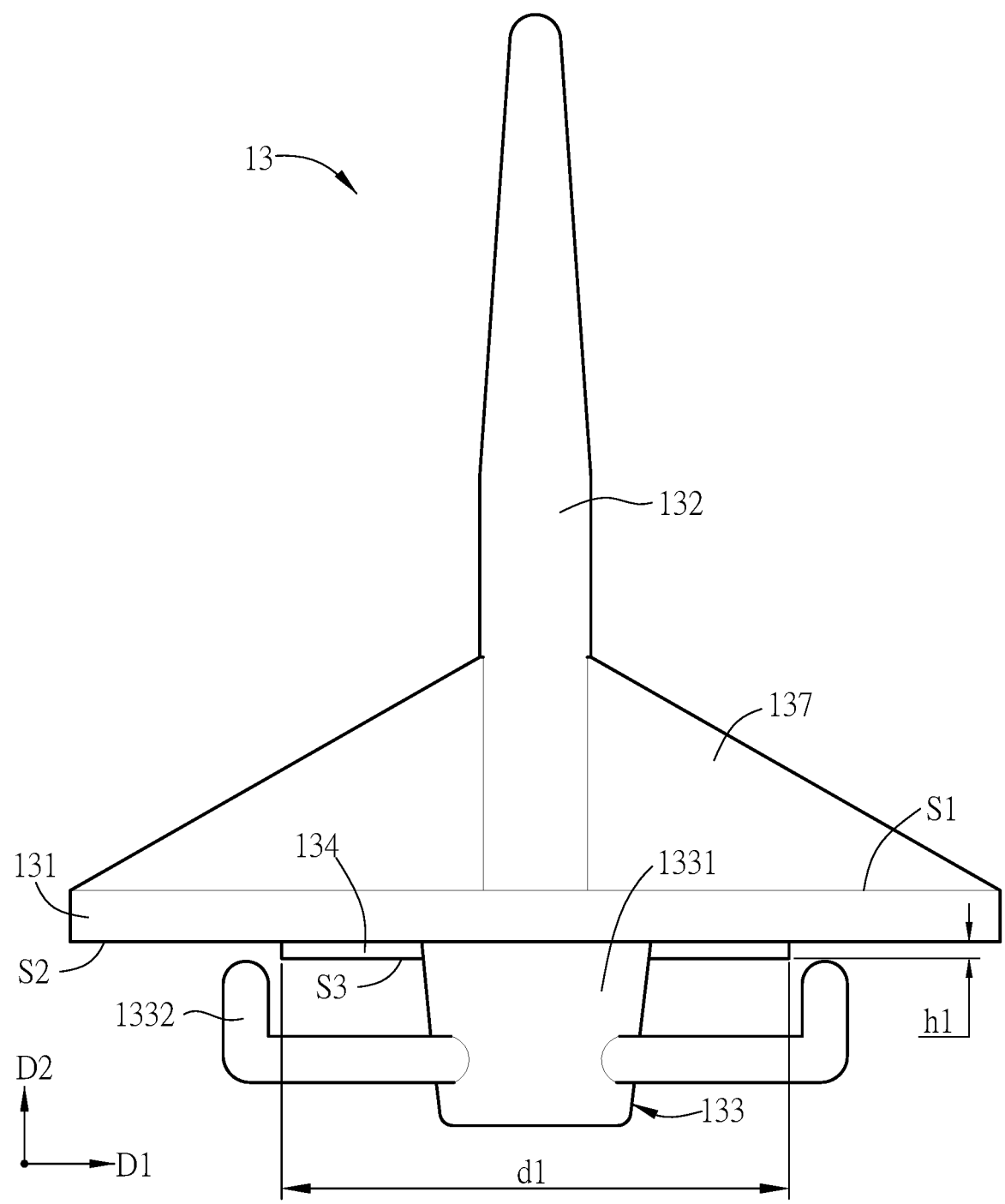
FIG. 2B is a cross-sectional view of the spacer element according to an embodiment of this disclosure.

The structure of the spacer element according to an embodiment will be further described hereinafter with reference to FIG. 1 in view of FIGS. 2A and 2B. FIGS. 2A and 2B are a schematic perspective diagram and a cross-sectional view of the spacer element 13 according to an embodiment of this disclosure. To be noted, the spacer element 13 can be integrally formed as one piece or be composed of several parts, and it can be made of plastics or metal material. In this embodiment, the spacer element 13 is integrally formed as one piece and is made of plastic material by, for example, injection molding.

As shown in FIGS. 2A and 2B, the spacer element 13 of this embodiment comprises a base portion 131, a supporting portion 132, a positioning portion 133 and a first protruding portion 134.

The base portion 131 has a first surface 51 and a second surface S2, which is opposite to the first surface 51. In this embodiment, the first surface 51 is the upper surface, and the second surface S2 is the lower surface. In some embodiments, the shape of the edge of the base portion 131 can be, for example, circular, arc-shaped, polygonal, wavy, sawtooth shape, or irregular. In this embodiment, the shape of the edge of the base portion 131 is circular. In the step of assembling the spacer element 13 on the back plate 11, the positioning portion 133 of the spacer element 13 is inserted through the through hole of the back plate 11 and then rotated by an angle (e.g. 90 degrees).

The supporting portion 132 is disposed on the first surface S1 of the base portion 131 and may contact or not contact the optical element 12. The back plate 11 can contact or not contact the second surface S2 of the base portion 131. The positioning portion 133 is disposed on the second surface S2 of the base portion 131. After the assembling step, the base portion 131 and the supporting portion 133 are located at the first side T1 of the back plate 11, the positioning portion 133 is located at the second side T2 of the back plate 11, and the optical element 12 is disposed on the supporting portion 132 (see FIG. 1). In this embodiment, a part of the back plate 11 is located between the base portion 131 and a part of the positioning portion 133. The positioning portion 133 of this embodiment may comprise a head part 1331 and two positioning bolts 1332. The head part 1331 is disposed on the second surface S2, and the positioning bolts 1332 are disposed on and connected to two opposite sides of the head part 1331. The two positioning bolts 1332 respectively extend from the two sides of the head part 1331 in parallel along a direction D1. In other embodiments of this disclosure, the number of the positioning bolts 1332 is not limited, so that the positioning portion 133 may comprise one or more than one positioning bolts 1332.

The first protruding portion 134 is disposed on the second surface S2 of the base portion 131 and located around the positioning portion 133. In some embodiments, the positioning portion 133 is located at a center of the first protruding portion 134, and the first protruding portion 134 is disposed around the positioning portion 133 to form a circle protrusion, an arc protrusion, a polygonal protrusion, or an irregular protrusion. As shown in FIG. 2A, the first protruding portion 134 is disposed around the head part 1331. In this case, the first protruding portion 134 is disposed around the positioning portion 133 to form a disc shape. The first protruding portion 134 has a third surface S3 away from the second surface S2, and the third surface S3 is parallel to the second surface S2. A first distance h1 is defined between the third surface S3 and the second surface S2. In some embodiments, the first distance h1, for example, is greater than or equal to 0.1 mm and is less than or equal to 20 mm (0.1 mm≤h1≤20 mm). In some embodiments, the maximum width d1 of the first protruding portion 134 along the direction D1 is, for example, 8 mm. The above numbers are for illustrations, and the sizes of the spacer elements 13 in various backlight modules or display devices can be different and can be modified based on the requirement of design.

In addition, the spacer element 13 further has at least a rib plate 137 connecting to the first surface S1 of the base portion 131 and the supporting portion 132. In this embodiment, two rib plates 137 are provided for respectively connecting to the two sides of the base portion 131 and the supporting portion 132. The configuration of the rib plate 137 can enhance the strength of the spacer element 13. Moreover, the spacer element 13 installed on the back plate 11 can make it easier to apply the rotation force and thus make the assembling step easier.

Figure 3A:
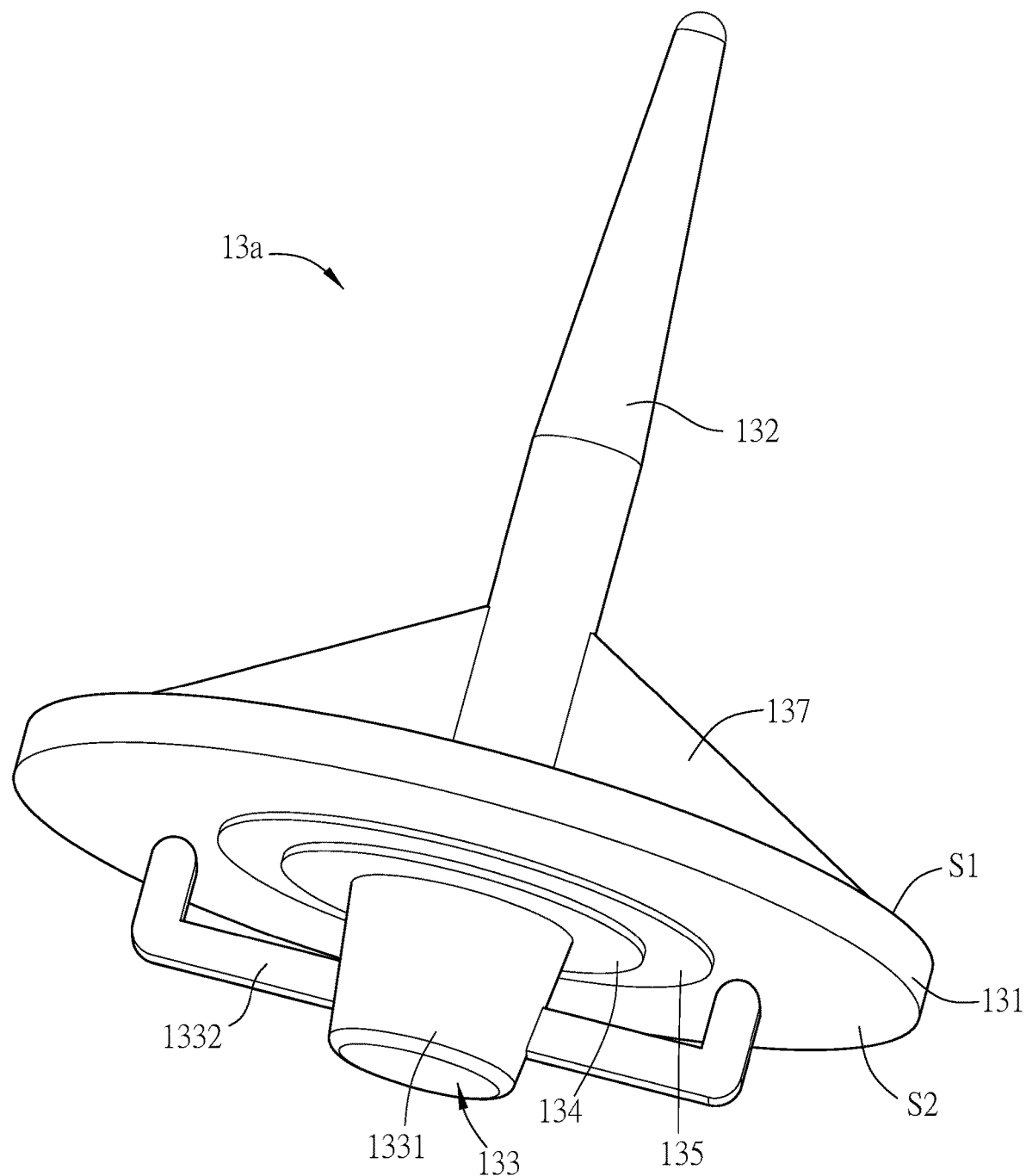
FIG. 3A is a schematic perspective diagram of the spacer element according to another embodiment of this disclosure.
Figure 3B:
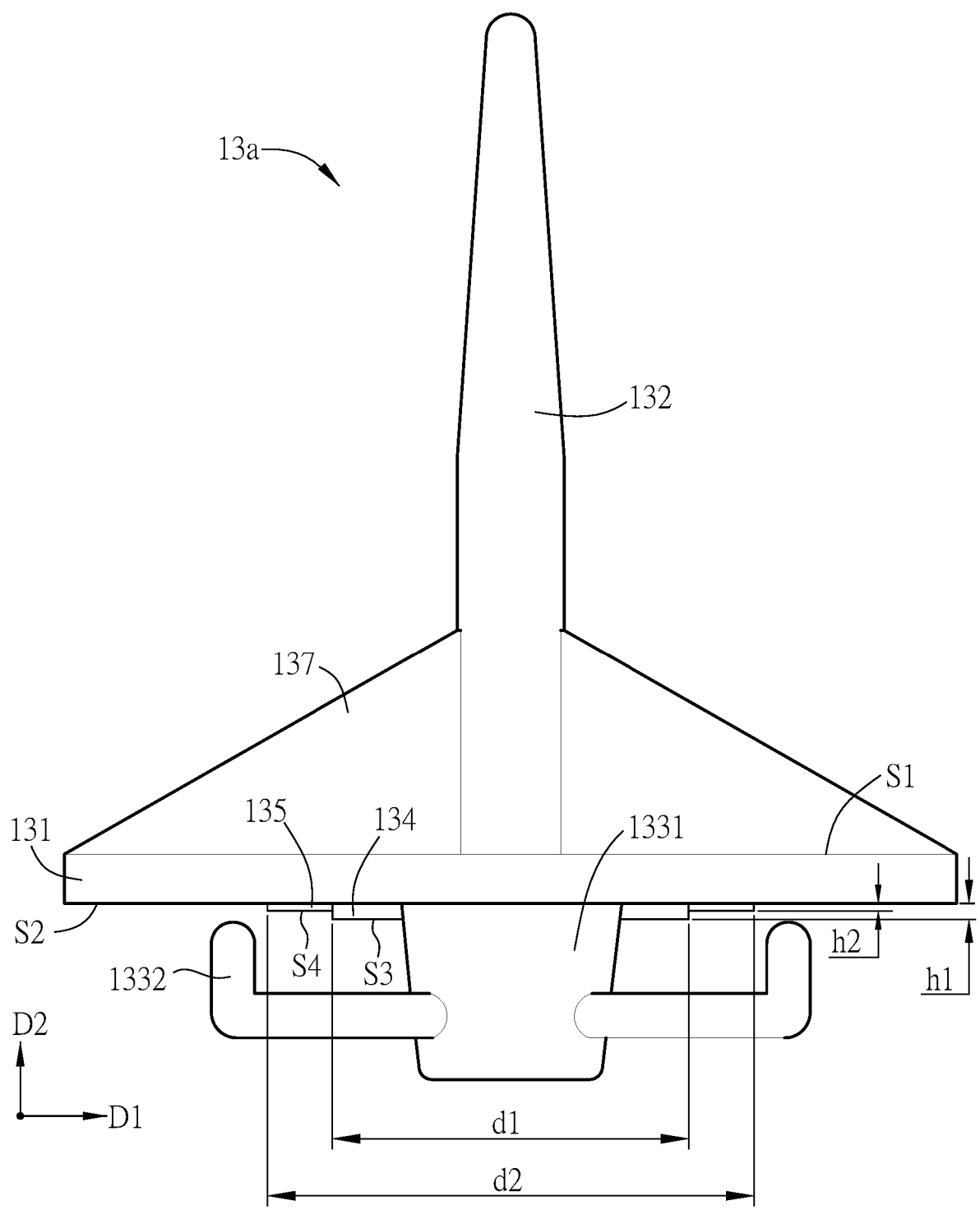
FIG. 3B is a cross-sectional view of the spacer element according to another embodiment of this disclosure.
Figure 3C:
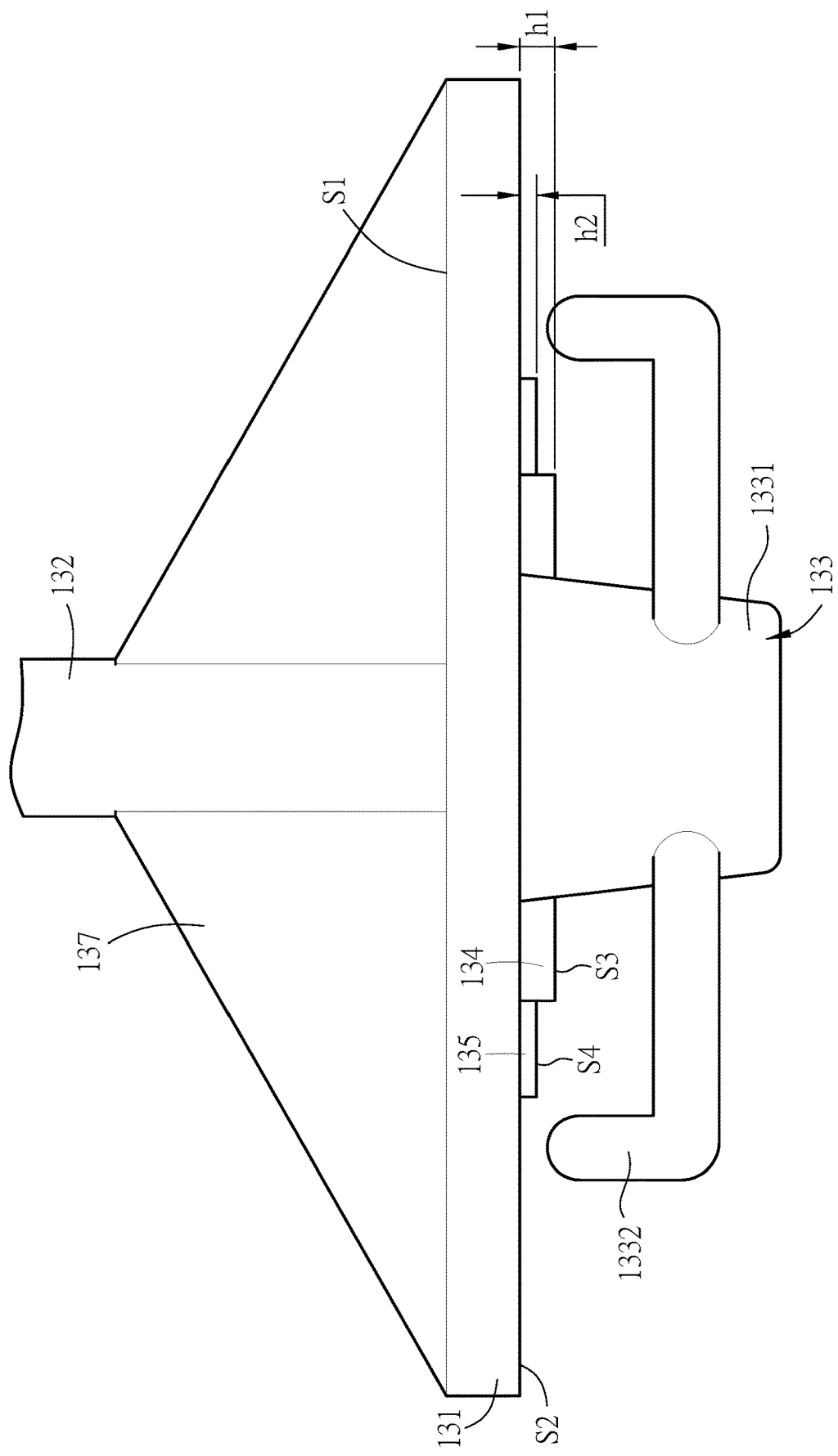
FIG. 3C is an enlarged view of a part of FIG. 3B.

FIGS. 3A and 3B are a schematic perspective diagram and a cross-sectional view of a spacer element 13a according to another embodiment of this disclosure, and FIG. 3C is an enlarged view of a part of FIG. 3B.

Different from the spacer element 13 of FIGS. 2A and 2B, the spacer element 13a of this embodiment comprises the base portion 131, the supporting portion 132, the positioning portion 133, the first protruding portion 134 and an addition second protruding portion 135. The second protruding portion 135 is disposed on the second surface S2 of the base portion 131 and located adjacent to the first protruding portion 134. The first protruding portion 134 is located between the second protruding portion 135 and the positioning portion 133. In some embodiments, the positioning portion 133 is located at a center of the second protruding portion 135, and the second protruding portion 135 is also disposed around the positioning portion 133 to form a circle protrusion, an arc protrusion, a polygonal protrusion, or an irregular protrusion. As shown in FIGS. 3A to 3C, the first protruding portion 134 and the second protruding portion 135 are disposed around the positioning portion 133 to form disc shapes. In this embodiment, the second protruding portion 135 is disposed at the outer side, and the first protruding portion 134 is disposed at the inner side.

The second protruding portion 135 has a fourth surface S4 away from the second surface S2, and a second distance h2 is defined between the fourth surface S4 and the second surface S2. Herein, the second distance h2 is less than the first distance h1. Accordingly, the first protruding portion 134 and the second protruding portion 135, which have different gaps (distances or heights), can form a stepwise structure. In some embodiments, the second distance h2, for example, is greater than or equal to 0.1 mm, and is less than or equal to 20 mm (0.1 mm≤h2≤20 mm). In some embodiments, a difference between the first distance h1 and the second distance h1 can be greater than or equal to 0.01 mm and be less than or equal to 10 mm (0.01 mm≤(h1−h2)≤10 mm). In this embodiment, the difference between the first distance h1 and the second distance h2 is, for example, 0.2 mm. In addition, the fourth surface S4 of this embodiment is parallel to the second surface S2.

In some embodiments, for example, the maximum width d2 of the second protruding portion 135 along the direction D1 is, for example 11 mm (d2>d1), the maximum width of the base portion 131 along the direction D1 is 20 mm, and the height of the supporting portion 132 along the direction D2 is 20 mm. To be noted, the above values are for illustrations, and the sizes of the spacer elements 13 in various backlight modules or display devices can be different and can be modified based on the requirement of design.

FIGS. 3D to 3G are schematic perspective diagrams and cross-sectional views of the spacer elements 13b and 13c according to different embodiments of this disclosure.

Figure 3D:
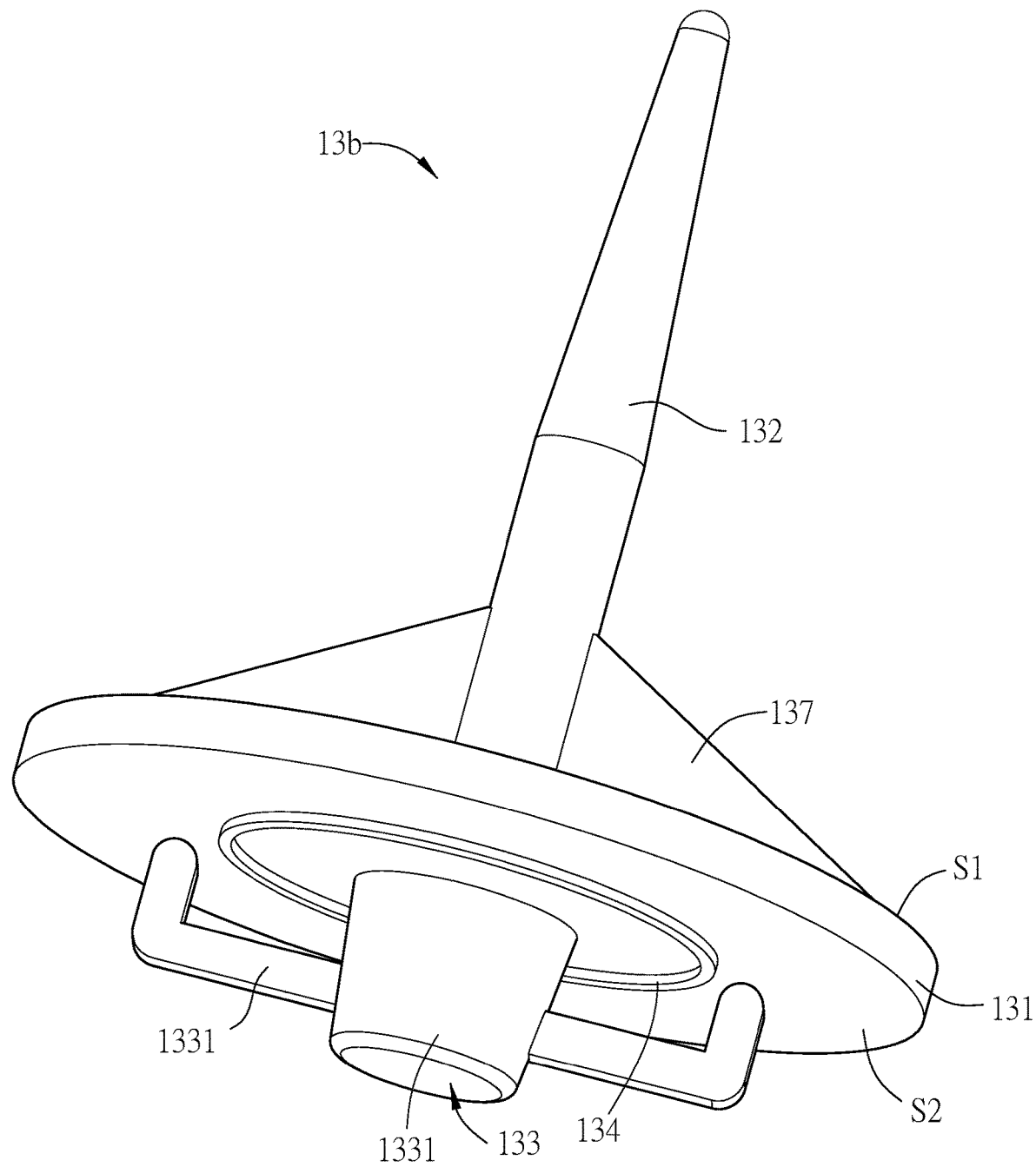
FIGS. 3D to 3G are schematic perspective diagrams and cross-sectional views of the spacer elements according to different embodiments of this disclosure.
Figure 3E:
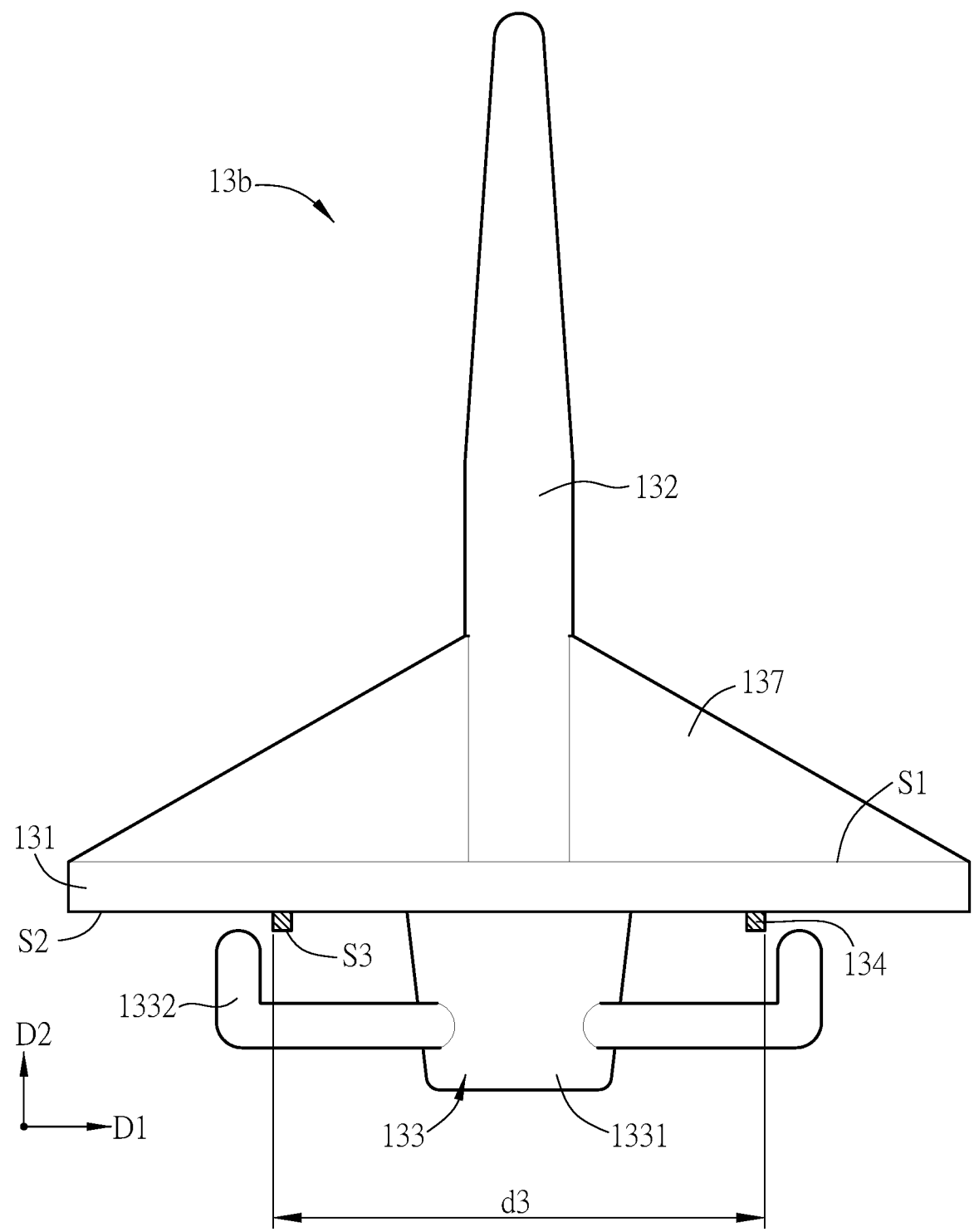

As shown in FIGS. 3D and 3E, different from the spacer element 13 of FIGS. 2A and 2B, the first protruding portion 134 of the spacer element 13b is continuously disposed around the positioning element 133 to form an annular structure, so that a gap can be formed between the first protruding portion 134 and the positioning element 133 of the spacer element 13b.

Figure 3F:
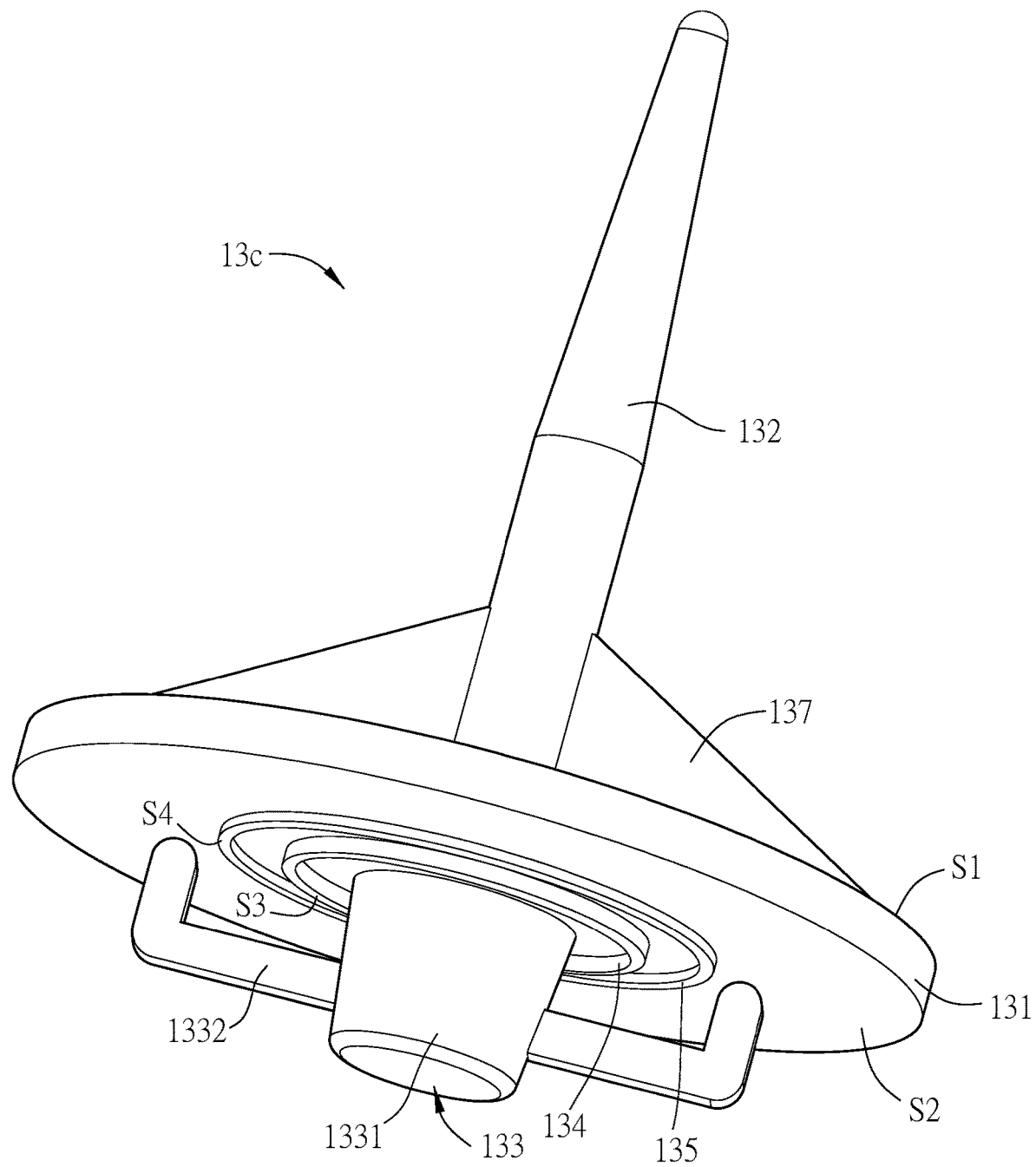
Figure 3G:
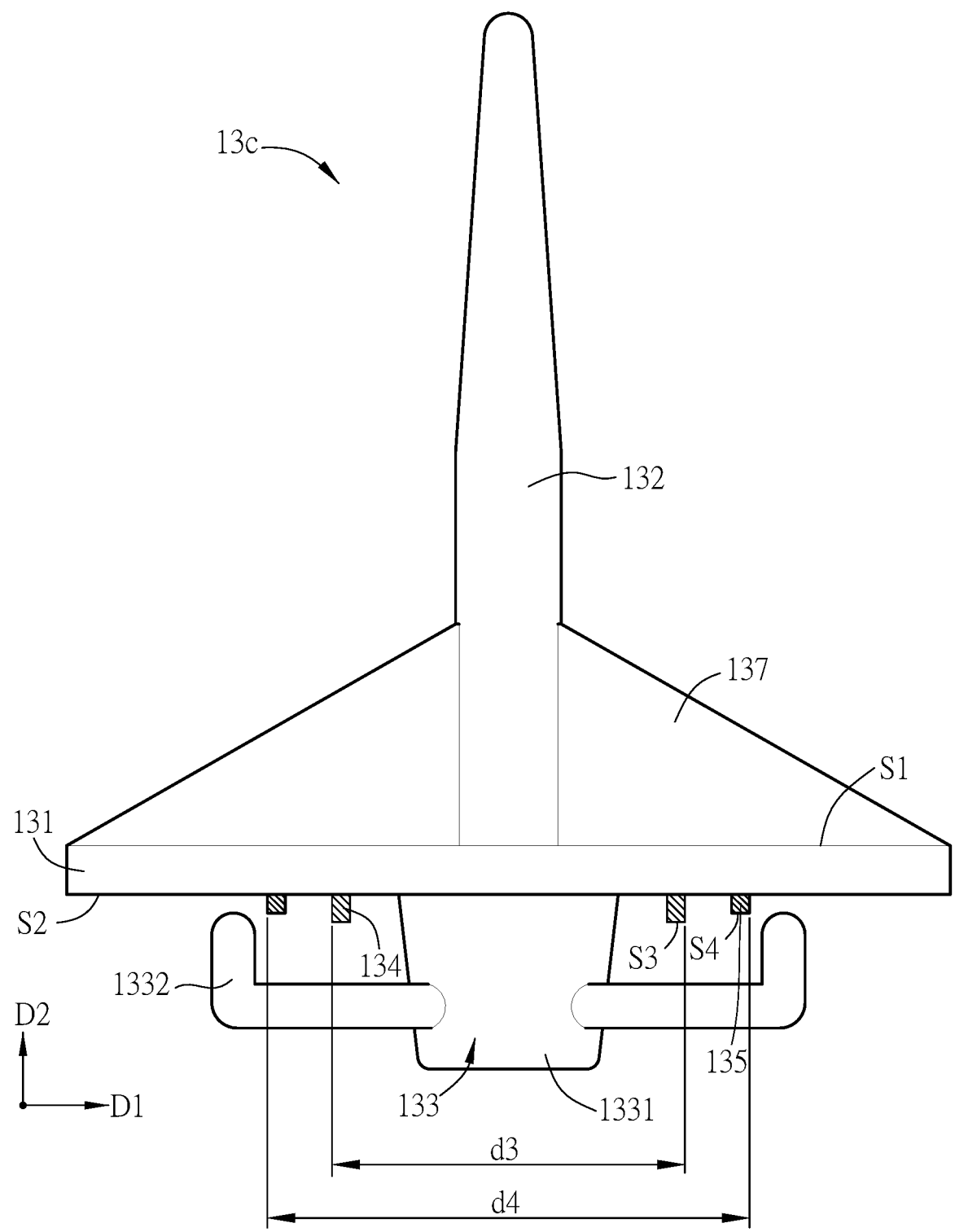

As shown in FIGS. 3F and 3Q different from the spacer element 13a of FIGS. 3A and 3B, the first protruding portion 134 and the second protruding portion 135 of the spacer element 13c is continuously disposed around the positioning element 133 to form two annular structures. The second protruding portion 135 is formed at the outer side, and the first protruding portion 134 is formed at the inner side. Accordingly, a gap can be formed between the first protruding portion 134 and the positioning element 133, and an additional gap can be formed between the second protruding portion 135 and the first protruding portion 134.

In the embodiments of FIGS. 3E and 3Q the ranges of the maximum width d3 of the first protruding portion 134 along the direction D1 and the maximum width d4 of the second protruding portion 135 along the direction D1 can be the same as the widths d1 and d2 as shown in FIGS. 2A and 3A. The detailed values thereof can be referred to the above embodiments. Of course, the values of the widths d3 and d4 can be the same as those of the above-mentioned widths d1 and d2, and this disclosure is not limited thereto.

The other features of the spacer elements 13b and 13c can be referred to the same components of the spacer elements 13 or 13a, so the detailed descriptions thereof will be omitted.

Figure 3H:
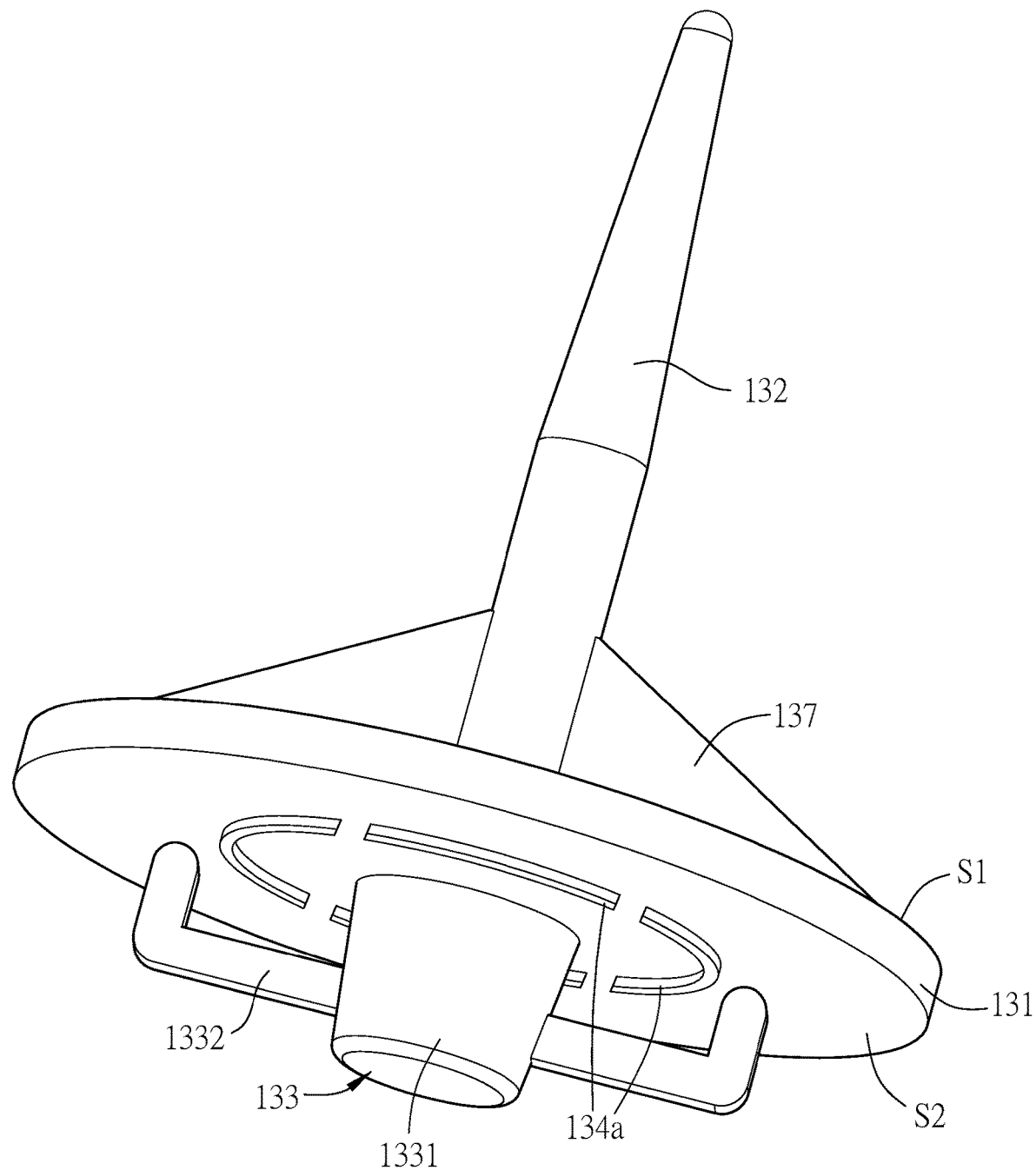
FIGS. 3H and 3I are schematic diagrams showing different aspects of the first protruding portions of this disclosure.
Figure 3I:
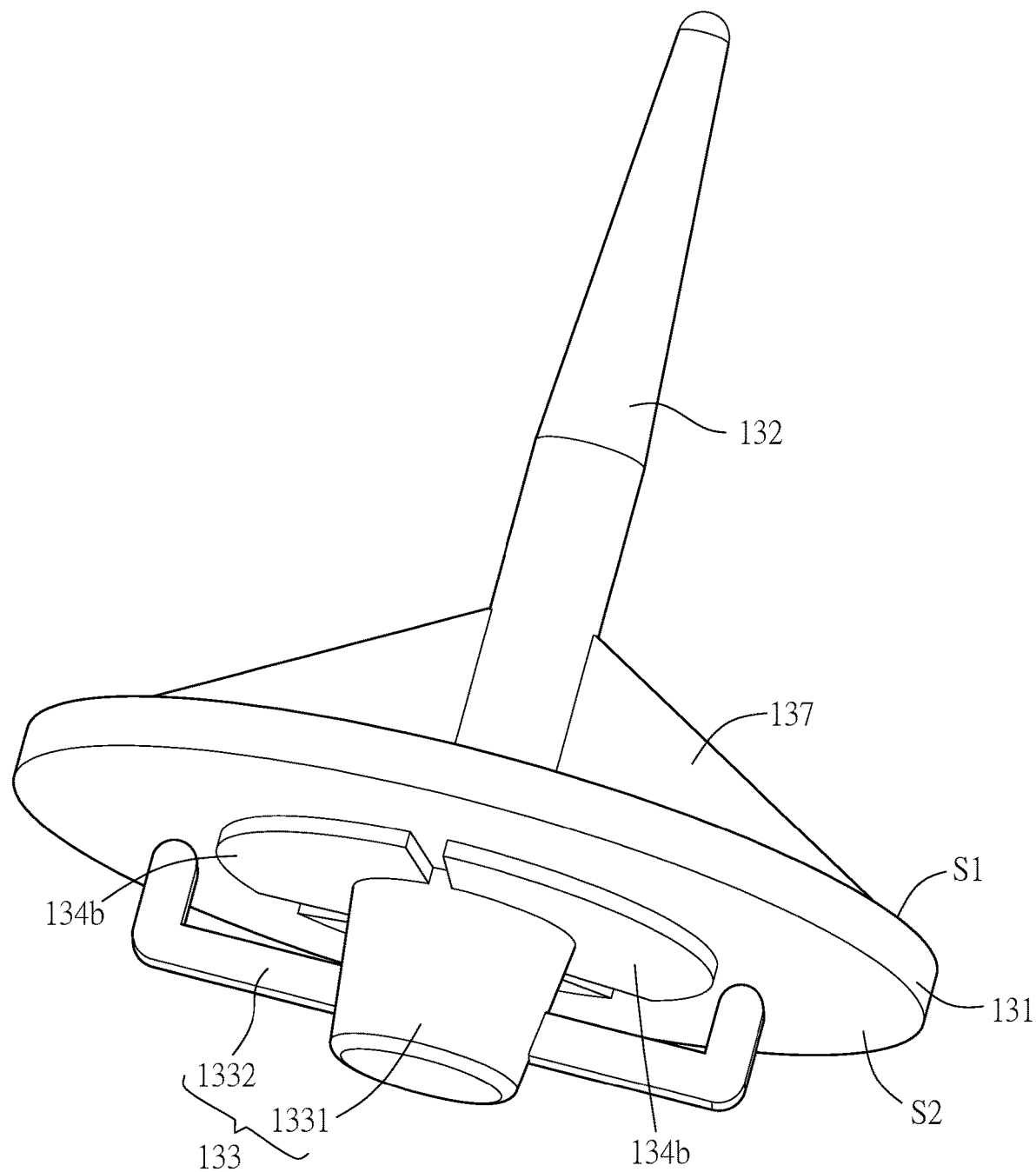

The shapes of the first protruding portion 134 and the second protruding portion 135 mentioned above are for illustrations, and can be different from the above-mentioned disclosure in other embodiments. For example, FIGS. 3H and 3I are schematic diagrams showing different aspects of the first protruding portions 134a of this disclosure. In FIG. 3H, the first protruding portion 134a is a discontinuous structure and comprises a plurality of arc sections (a gap is formed between two adjacent arc sections). Alternatively, in FIG. 3I, the first protruding portion 134b comprises a plurality of sector sections (a gap is formed between two adjacent sector sections). Of course, in other embodiments, the second protruding portion may have the similar structure as the above-mentioned first protruding portion.

In addition, the spacer element 13 can be used in the back plates 11 with different thicknesses. In the following embodiment, the spacer element 13a is applied to the back plates 11 with different thicknesses.

Figure 4A:
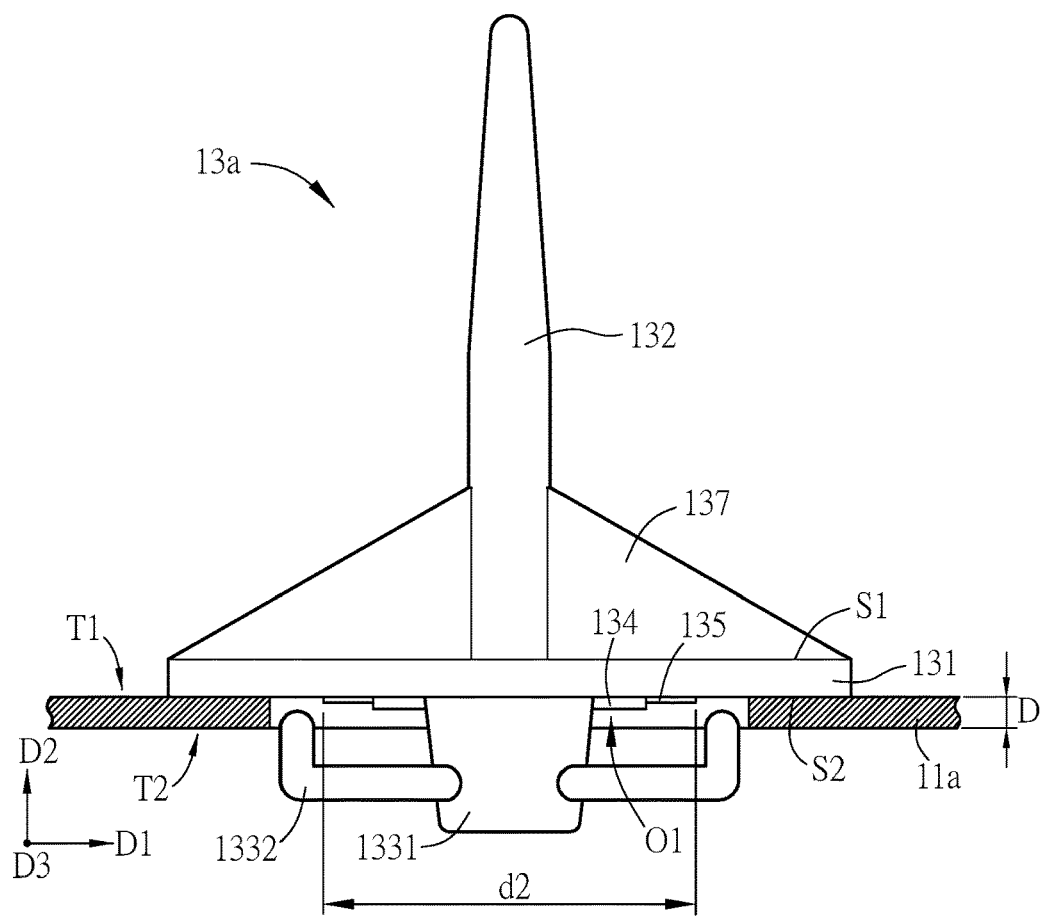
FIGS. 4A, 5A and 6A are schematic diagrams showing the spacer element according an embodiment of this disclosure that connects to the back plates with different thicknesses.
Figure 4B:
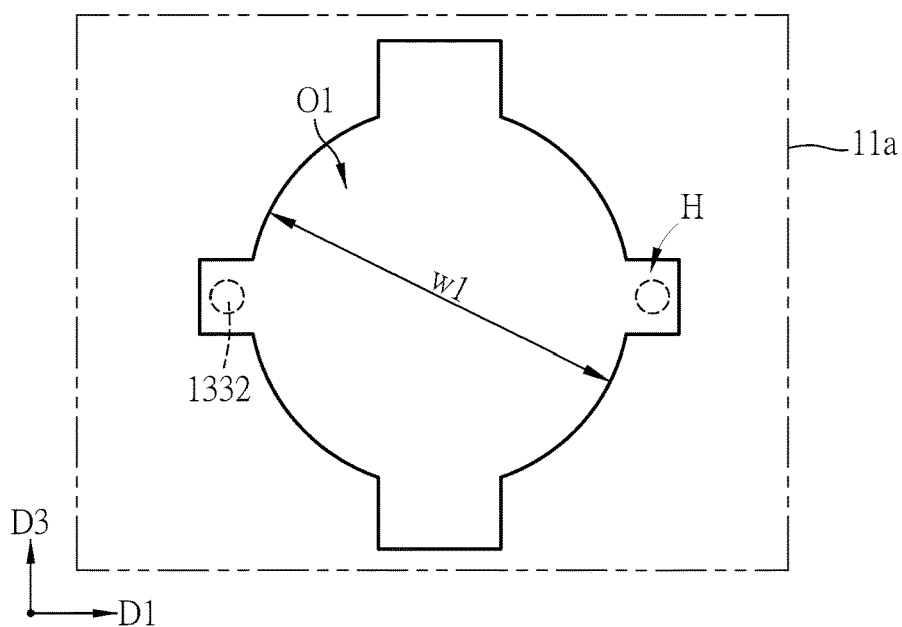
FIGS. 4B, 5B and 6B are top views of the back plates shown in FIGS. 4A, 5A and 6A.
Figure 5A:
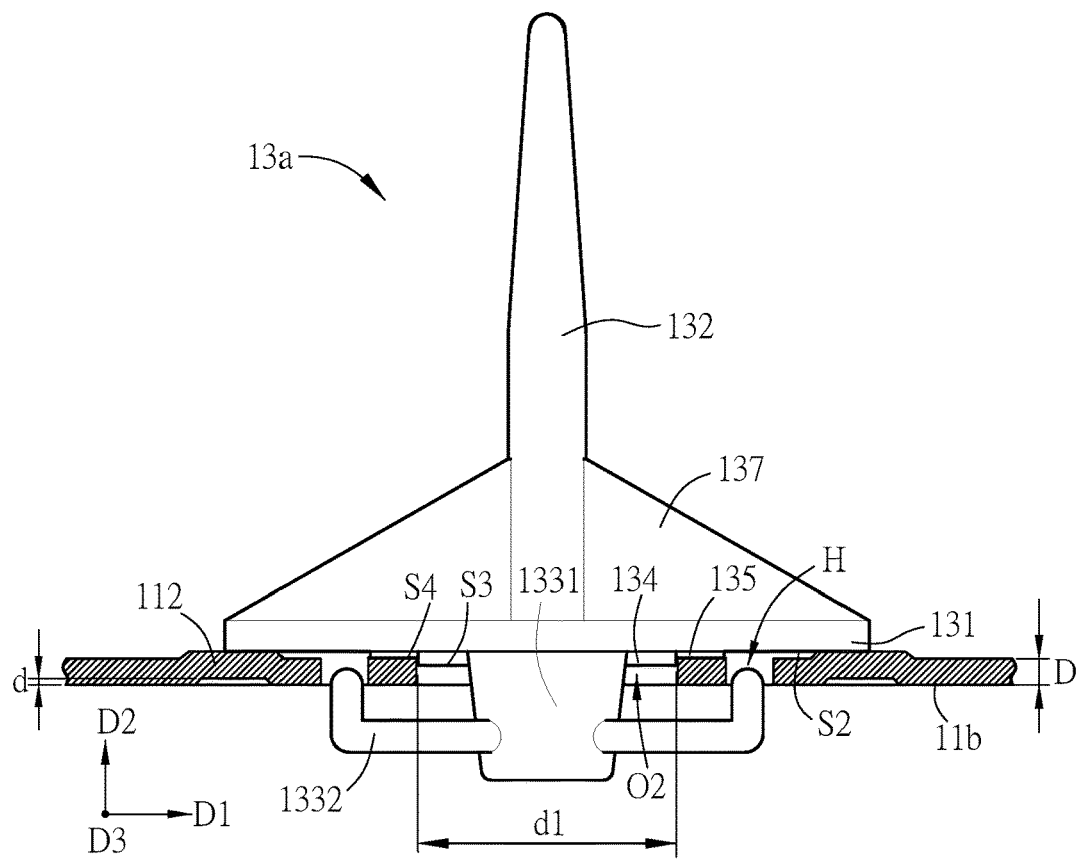
Figure 5B:
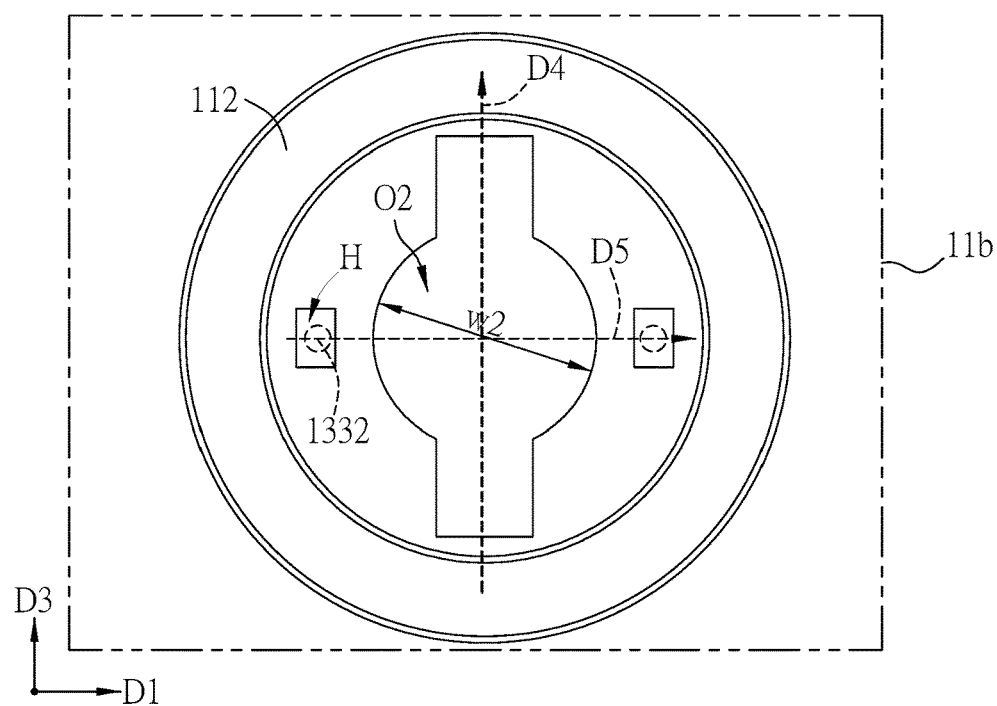
Figure 6A:
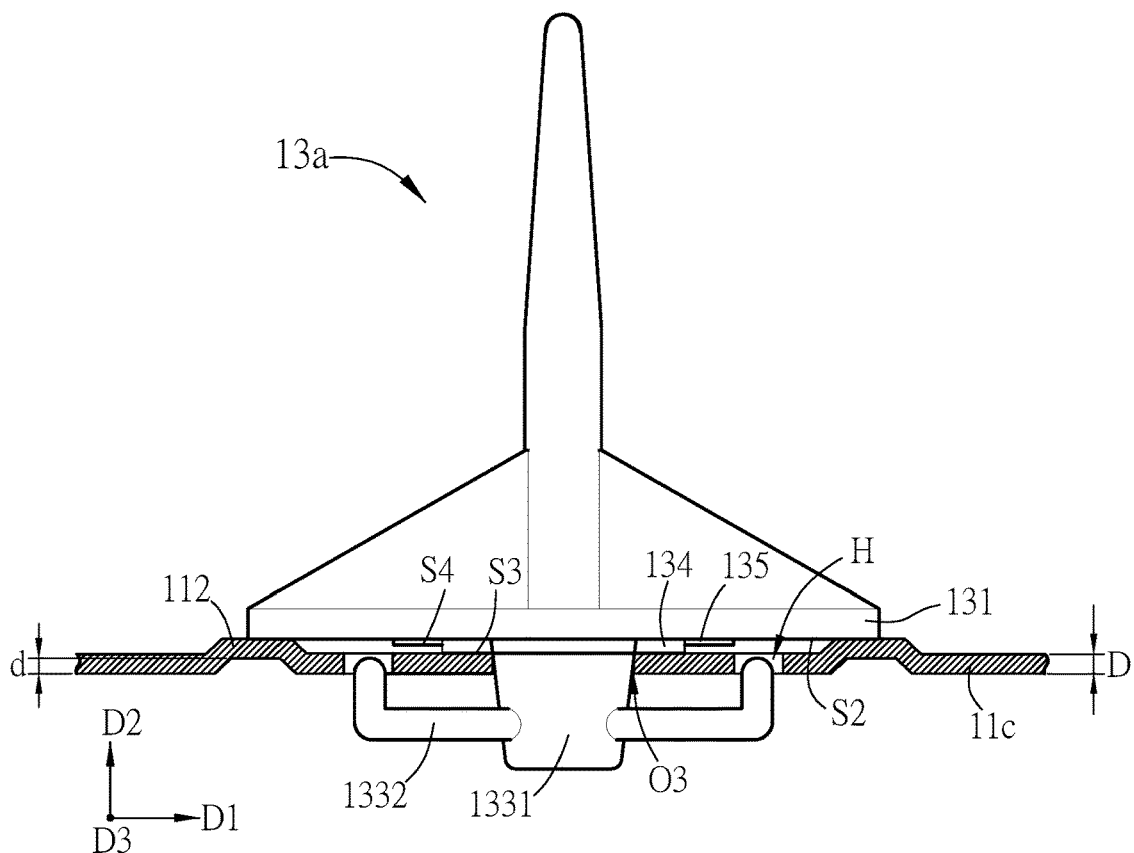
Figure 6B:
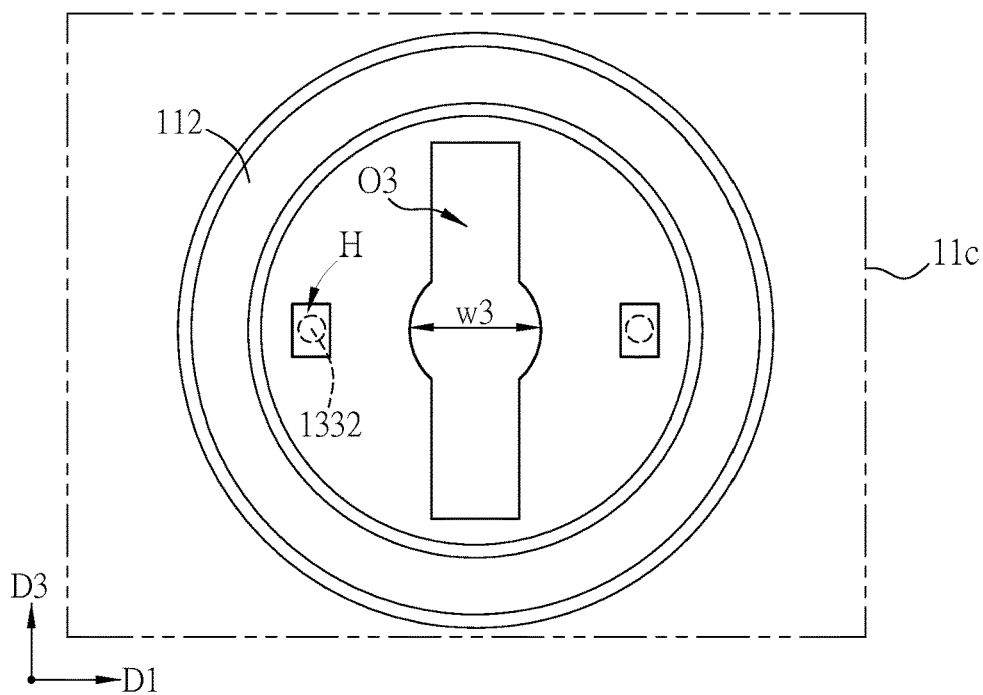

FIGS. 4A, 5A and 6A are schematic diagrams showing the spacer element 13a according an embodiment of this disclosure that connects to the back plates 11a, 11b and 11c with different thicknesses, and FIGS. 4B, 5B and 6B are top views of the back plates 11a, 11b and 11c shown in FIGS. 4A, 5A and 6A. In this embodiment, FIGS. 4B, 5B and 6B show the top views of the back plates 11a, 11b and 11c from the inner sides (the first sides T1) of the back plates 11a, 11b and 11c.

As shown in FIGS. 4A and 4B, the thickness D of the back plate 11a along the direction D2 is, for example, 1.0 mm. In the step of assembling the spacer element 13a on the back plate 11a, the spacer element 13a passes through the first side T1 of the back plate 11a and goes downwardly to pass through the back plate 11a. Accordingly, the back plate 11a must be configured with a through hole O1 corresponding to the spacer element 13a. In this embodiment, as shown in FIGS. 4A and 4B, the through hole O1 has a diameter w1, which is the minimum diameter of the through hole O1. In addition, the second protruding portion 135 has a second width d2, which is the maximum width of the second protruding portion 135. The diameter w1 must be greater than or equal to the second width d2. Accordingly, the second protruding portion 135 (as well as the first protruding portion 134 and the positioning portion 133) can pass through the through hole O1 of the back plate 11a. Moreover, in this embodiment, the two positioning bolts 1332 of the positioning portion 133 can also pass through the through hole O1. When the second protruding portion 135, the first protruding portion 134 and the positioning portion 133 pass through the through hole O1 of the back plate 11a, the extension direction of the two positioning bolts 1332 is parallel to the direction D3. Afterwards, for example, the spacer element 13a is rotated for 90 degrees, so that the extension direction of the positioning bolts 1332 becomes to be parallel to the direction D1. As a result, one end of the positioning bolts 1332 can be engaged in the hole extension portions (the positioning holes H) disposed at two sides of the through hole O1, so a part of the back plate 11a is disposed between the second surface S2 and a part of the positioning portion 133, thereby positioning and fixing the spacer element 13a on the back plate 11a. As shown in FIG. 4A, the back plate 11a contacts the second surface S2 of the base portion 131, and can contact or not contact the second protruding portion 135.

In addition, as shown in FIGS. 5A and 5B, the thickness D of the back plate 11b along the direction D2 is less than that of the back plate 11a, and is, for example, 0.8 mm. In this embodiment, the back plate 11b comprises a through hole O2, which has a diameter w2. Similarly, in the step of assembling the spacer element 13a on the back plate 11b, the spacer element 13a must pass through the back plate 11b. As shown in FIG. 5B, the diameter w2 of the through hole O2 is greater than or equal to the maximum width d1 of the first protruding portion 134, so that the first protruding portion 134 (as well as the positioning portion 133) can pass through the through hole O2 of the back plate 11b. In addition, the diameter w2 must be less than the second width d2 of the second protruding portion 135. Accordingly, a part of the back plate 11b can contact the fourth surface S4 and be located between the fourth surface S4 of the second protruding portion 135 and a part of the positioning portion 133, and the spacer element 13a can be positioned and fixed on the back plate 11b.

In addition, the back plate 11b further comprises two positioning holes H, which are located close to two opposite sides of the through hole O2. When the first protruding portion 134 (as well as the positioning portion 133) passes through the through hole O2 of the back plate 11b, the extension direction of the two positioning bolts 1332 is parallel to the direction D3. Afterwards, for example, the spacer element 13a is rotated for 90 degrees, so that the extension direction of the positioning bolts 1332 becomes to be parallel to the direction D1. As a result, one end of the positioning bolts 1332 can be engaged in the positioning holes H disposed at two sides of the back plate 11b (the positioning holes H are disposed corresponding to one end of the positioning bolts 1332), so the spacer element 13a can be positioned and fixed on the back plate 11b. In this embodiment, the shape of the positioning holes H is not limited and it can be circular, arc-shaped, polygonal, or irregular. Any shape of the positioning holes H that can correspondingly fix one end of the positioning bolt 1332 therein so as to position and fix the spacer element 13a is acceptable.

In addition, the two positioning bolts 1332 of the positioning portion 133 can pass through the through hole O2 of the back plate 11b. In this embodiment, the through hole O2 can define a long-axial direction D4 (parallel to the direction D3), and the extension direction of the line liking two positioning holes H can define a line direction D5 (parallel to the direction D1). The long-axial direction D4 and the line direction D5 are intersected with each other and are not parallel to each other. An included angle (e.g. 90 degrees) is formed between the long-axial direction D4 and the line direction D5. Moreover, as shown in FIG. 5A, the back plate 11b contacts the fourth surface S4 of the second protruding portion 135, and can contact or not contact the first protruding portion 134.

In the back plate 11b of this embodiment, the through hole O2 and the positioning holes H are not connected. This configuration can increase the contact area between the spacer element 13a and the back plate 11b, thereby increasing the stability of fixing the spacer element 13a on the back plate 11b. In addition, as shown in FIG. 5A, the back plate 11b contacts the second protruding portion 135, so a gap can be formed between the second surface S2 of the base portion 131 and the back plate 11b. Thus, the external objects (e.g. dusts) can easily enter this gap. Accordingly, the back plate 11b of this embodiment is further configured with a convex portion 112 protruding toward the base portion 131 (the direction D2). The convex portion 112 is disposed adjacent to the through hole O2 and is at least partially (partially or totally) overlapped with the base portion 131, so that the convex portion 112 can contact the second surface S2. The protruding height d of the convex portion 112 of this embodiment is, for example, 0.2 mm. The convex portion 112 can be an entire ring structure or comprise a plurality of sections, and this disclosure is not limited thereto. The configuration of the convex portion 112 on the back plate 11b can block the external objects from entering the gap therebetween (the entire ring structure), or increase the contact area between the spacer element 13a and the back plate 11b for increasing the connection stability (the entire ring structure or a plurality of sections).

In addition, as shown in FIGS. 6A and 6B, the thickness D of the back plate 11c along the direction D2 is less than that of the back plate 11a or 11b, and is, for example, 0.6 mm. Similarly, in the step of assembling the spacer element 13a on the back plate 11c, the spacer element 13a must pass through the back plate 11c. As shown in FIG. 6B, the diameter w3 of the through hole O3 of the back plate 11c is greater than or equal to the maximum width (not shown) of the positioning portion 133 along the direction D1, so that the positioning portion 133 can pass through the through hole O3. In addition, the diameter w3 of the back plate 11c must be less than the maximum width d1 of the first protruding portion 134 and the maximum width d2 of the second protruding portion 135. Accordingly, a part of the back plate 11c can be located between the third surface S3 of the first protruding portion 134 and a part of the positioning portion 133 and between the fourth surface S4 of the second protruding portion 135 and a part of the positioning portion 133.

In addition, when the positioning portion 133 passes through the through hole O3 of the back plate 11c, the extension direction of the two positioning bolts 1332 is parallel to the direction D3. Afterwards, for example, the spacer element 13a is rotated for 90 degrees, so that the extension direction of the positioning bolts 1332 becomes to be parallel to the direction D1. As a result, one end of the positioning bolts 1332 can be respectively engaged in the positioning holes H disposed at two sides of the back plate 11c, so the spacer element 13a can be positioned and fixed on the back plate 11c.

In this embodiment, as shown in FIG. 6A, the back plate 11c contacts the third surface S3 of the first protruding portion 134, and can contact or not contact the positioning portion 133. In the back plate 11c, the through hole O3 and the positioning holes H are not connected. This configuration can increase the contact area between the spacer element 13a and the back plate 11c, thereby increasing the stability of fixing the spacer element 13a on the back plate 11c. In addition, as shown in FIG. 6A, the back plate 11c contacts the first protruding portion 134, so a gap can be formed between the second surface S2 of the base portion 131 and the back plate 11c (the gap is larger than that of the back plater 11b). Accordingly, the back plate 11c of this embodiment is also configured with a convex portion 112 protruding toward the base portion 131 (the direction D2). The convex portion 112 is at least partially (partially or totally) overlapped with the base portion 131, so that the convex portion 112 can contact the second surface S2. In this embodiment, the protruding height d of the convex portion 112 of this embodiment is, for example, 0.4 mm.

To be noted, in the back plate 11a, 11b or 11c of the above-mentioned embodiment, the spacer element 13a can pass through the through hole O1, O2 or O3 of the back plate 11a, 11b or 11c and then be fixed on the back plate 11a, 11b or 11c. In addition, the positions of the through holes O1, O2 and O3 of the back plates 11a, 11b and 11c, which have different thicknesses, have different widths. In specific, the back plates 11a, 11b and 11c, which have different thicknesses, have different hole widths. As shown in FIGS. 4B, 5B and 6B, the positions where the spacer elements 13a pass through the back plates 11a, 11b and 11c have different diameters w1, w2 and w3 (w1>w2>w3). In other words, the width (diameter) configured for the spacer element 13a to pass through will be larger as the back plate 11 is thicker. In this embodiment, the shapes of the through hole O1 (FIG. 4B), the through hole O2 (FIG. 5B) and the through hole O3 (FIG. 6B) are for illustrations, and this disclosure is not limited thereto. In other embodiments, the shapes of the through holes O1, O2 and O3 can be different.

In addition, after passing through the back plate 11a, 11b or 11c, the spacer element 13a is positioned by the positioning hole H of the back plate 11a, 11b or 11c. In other embodiments, the spacer element 13a can be positioned by other structures. For example, a concave portion (not shown) can be provided on the back plate 11a, 11b or 11c corresponding to one end of the two positioning bolts 1332, so that one end of the two positioning bolts 1332 can be respectively engaged in the concave portions for positioning the spacer element 13a. Alternatively, a rough structure can be formed on the back plate 11a, 11b or 11c correspondingly, so that one end of the two positioning bolts 1332 can be positioned by the fractions between the ends of two positioning bolts 1332 and the back plate 11a, 11b or 11c. This disclosure is not limited thereto.

In the above embodiments, each of the spacer elements 13a and 13c comprises two protruding structures (the protruding portions 134 and 135). In other embodiments, the spacer element 13 can further comprise a third protruding portion (or more protruding portions, not shown), and the second protruding portion 135 is located between the third protruding portion and the first protruding portion 134. In addition, the distance between the third protruding portion and the second surface S2 is less than the second direction h2 between the second protruding portion 135 and the second surface S2. This configuration can be applied to more back plates 11 having different thicknesses.

In addition, the above-mentioned spacer element 13a can be applied to three back plates having different thicknesses, and each of the spacer elements 13, 13b and 13c can be applied to the back plates having at least two different thicknesses. The descriptions thereof can be referred to the spacer element 13a, so the detailed descriptions thereof will be omitted.

Figure 7:
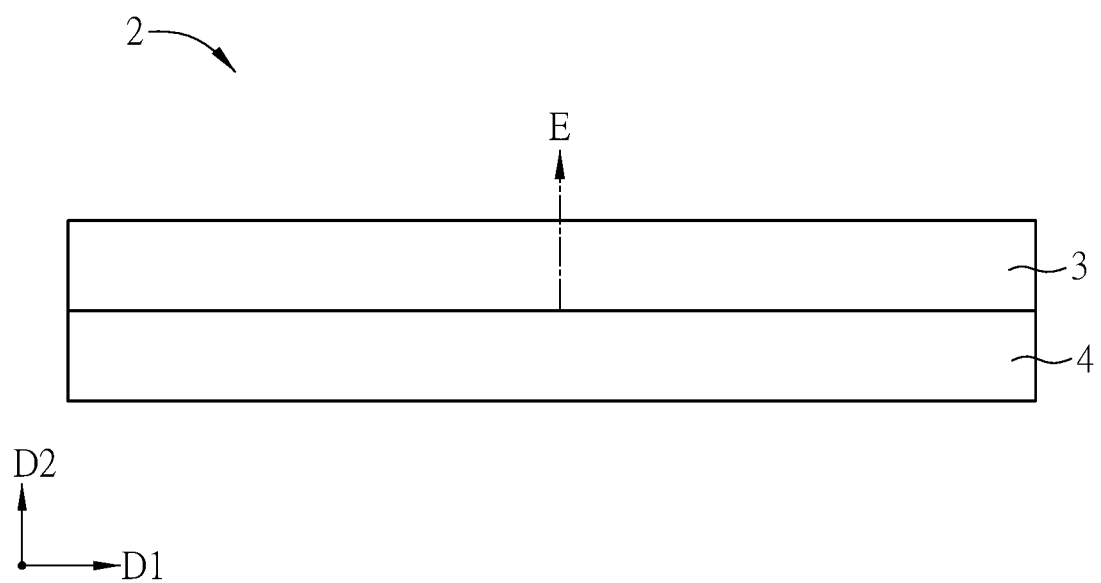
FIG. 7 is a schematic diagram showing a display device according to an embodiment of this disclosure.

FIG. 7 is a schematic diagram showing a display device 2 according to an embodiment of this disclosure.

The display device 2 comprises a display panel 3 and a backlight module 4, which are disposed corresponding to each other. When the light E emitted from the backlight module 4 passes through the display panel 3, the pixels of the display panels 3 can display colors to form an image. In this embodiment, the display panel 3 is, for example but not limited to, a liquid crystal display (LCD) panel. The backlight module 4 can be the above-mentioned backlight module 1 or any modification thereof. The detailed technical contents thereof can be referred to the above embodiments, so the detailed descriptions thereof will be omitted.

In summary, in the backlight module and display device of this disclosure, the spacer element comprises a supporting portion disposed on the first surface of the base portion, a positioning portion disposed on the second surface of the base portion, and a first protruding portion disposed on the second surface of the base portion and located around the positioning portion. The first protruding portion has a third surface away from the second surface, and the third surface is parallel to the second surface. The optical element is disposed on the spacer element, and a part of the back plate is located between the base portion and a part of the positioning portion. According to the structural design of this disclosure, the spacer element can cooperate with the back plates with different thicknesses, thereby achieving the functions of assembling alignment and supporting, reducing the cost for developing the molds of the spacer elements, or decreasing the cost for managing and storing the raw materials.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A display device, comprising:
    a display panel; and
    a backlight module disposed corresponding to the display panel and comprising:
        a back plate;
        a spacer element passing through the back plate and comprising:
            a base portion having a first surface and a second surface disposed opposite to the first surface;
            a supporting portion disposed on the first surface;
            a positioning portion disposed on the second surface; and
            a first protruding portion disposed on the second surface and located around the positioning portion, wherein the first protruding portion has a third surface away from the second surface, and the third surface is parallel to the second surface; and
        an optical element disposed on the spacer element;
        wherein a part of the back plate is located between the base portion and a part of the positioning portion, and
        wherein the positioning portion comprises a head part and a positioning bolt, the head part is disposed on the second surface, the positioning bolt is disposed on a side surface of the head part, and the back plate further comprises a positioning hole disposed corresponding to the positioning bolt.

2. The display device according to claim 1, wherein the spacer element further comprises a second protruding portion, the second protruding portion is disposed on the second surface, the first protruding portion is located between the positioning portion and the second protruding portion, the second protruding portion has a fourth surface away from the second surface, a first distance is defined between the third surface and the second surface, a second distance is defined between the fourth surface and the second surface, and the second distance is less than the first distance.

3. The display device according to claim 2, wherein the part of the back plate is located between the fourth surface and the part of the positioning portion.

4. The display device according to claim 1, wherein the part of the back plate is located between the third surface and the part of the positioning portion, or is located between the second surface and the part of the positioning portion.

5. The display device according to claim 1, wherein the back plate further comprises a convex portion, and the convex portion contacts the second surface.

6. The display device according to claim 1, wherein the positioning portion is located at a center of the first protruding portion, and the first protruding portion is disposed around the positioning portion to form a circle protrusion, an arc protrusion, a polygonal protrusion, or an irregular protrusion.

7. The display device according to claim 1, wherein the first protruding portion is continuously disposed around the positioning portion to form an annular structure, and a gap is formed between the first protruding portion and the positioning portion.

8. A backlight module, comprising:
    a back plate;
    a spacer element passing through the back plate and comprising:
        a base portion having a first surface and a second surface disposed opposite to the first surface;
        a supporting portion disposed on the first surface;
        a positioning portion disposed on the second surface; and
        a first protruding portion disposed on the second surface and located around the positioning portion, wherein the first protruding portion has a third surface away from the second surface, and the third surface is parallel to the second surface; and
    an optical element disposed on the spacer element;
    wherein a part of the back plate is located between the base portion and a part of the positioning portion, and
    wherein the positioning portion comprises a head part and a positioning bolt, the head part is disposed on the second surface, the positioning bolt is disposed on a side surface of the head part, and the back plate further comprises a positioning hole disposed corresponding to the positioning bolt.

9. The backlight module according to claim 8, wherein the spacer element further comprises a second protruding portion, the second protruding portion is disposed on the second surface, the first protruding portion is located between the positioning portion and the second protruding portion, the second protruding portion has a fourth surface away from the second surface, a first distance is defined between the third surface and the second surface, a second distance is defined between the fourth surface and the second surface, and the second distance is less than the first distance.

10. The backlight module according to claim 9, wherein the part of the back plate is located between the fourth surface and the part of the positioning portion.

11. The backlight module according to claim 8, wherein the part of the back plate is located between the third surface and the part of the positioning portion, or is located between the second surface and the part of the positioning portion.

12. The backlight module according to claim 8, wherein the back plate further comprises a convex portion, and the convex portion contacts the second surface.

13. The backlight module according to claim 8, wherein the positioning portion is located at a center of the first protruding portion, and the first protruding portion is disposed around the positioning portion to form a circle protrusion, an arc protrusion, a polygonal protrusion, or an irregular protrusion.

14. The backlight module according to claim 8, wherein the first protruding portion is continuously disposed around the positioning portion to form an annular structure, and a gap is formed between the first protruding portion and the positioning portion.

15. A display device, comprising:
    a display panel; and
    a backlight module disposed corresponding to the display panel and comprising:
        a back plate;

a spacer element passing through the back plate and comprising:
  a base portion having a first surface and a second surface disposed opposite to the first surface;
  a supporting portion disposed on the first surface;
  a positioning portion disposed on the second surface;
  a first protruding portion disposed on the second surface, wherein the first protruding portion has a third surface away from the second surface, and a first distance is defined between the third surface and the second surface; and
  a second protruding portion disposed on the second surface, wherein the first protruding portion is located between the positioning portion and the second protruding portion, the second protruding portion has a fourth surface away from the second surface, a second distance is defined between the fourth surface and the second surface, and the second distance is less than the first distance; and
an optical element disposed on the spacer element;
wherein a part of the back plate is located between the base portion and a part of the positioning portion, and wherein the positioning portion comprises a head part and a positioning bolt, the head part is disposed on the second surface, the positioning bolt is disposed on a side surface of the head part, and the back plate further comprises a positioning hole disposed corresponding to the positioning bolt.

\* \* \* \* \*